United States Patent Office 3,741,770
Patented June 26, 1973

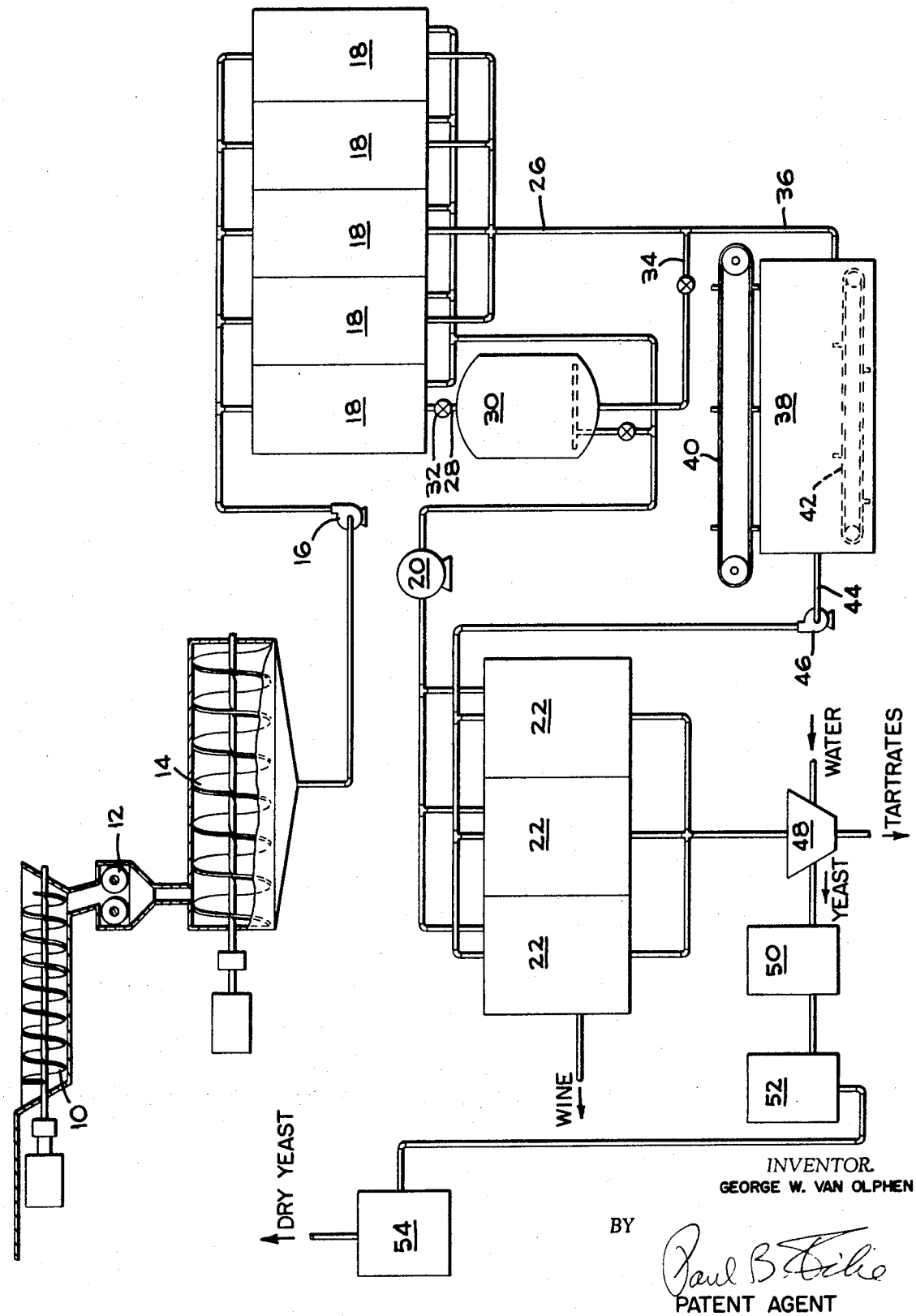

3,741,770
PREPARATION OF WINE
George W. van Olphen, 2229 Brown Ave.,
Santa Clara, Calif. 95051
Continuation of abandoned application Ser. No. 822,606, May 7, 1969. This application Aug. 20, 1971, Ser. No. 173,632
Int. Cl. C12g 1/02
U.S. Cl. 99—35                        3 Claims

ABSTRACT OF THE DISCLOSURE

A winemaking process wherein the grape must received from a press is first depectinized, the depectinized must is placed under pressure with an inert gas, the insoluble solids and free run juice are then separated by a flotation step at atmospheric pressure and the clean juice is then fermented.

---

This application is a continuation of application Ser. No. 822,606, filed May 7, 1969, now abandoned.

The present invention relates to an improved process for making wines.

BACKGROUND OF THE INVENTION

As the relatively complex chemistry involved in the making of wine has become better understood, various controls have been placed on the winemaking process in an effort to enhance the consistent excellent quality of the product. By way of example, the old processes utilized the wild yeasts existent on the skins of the grapes to instigate the chemical reaction whereby the grape sugars were converted into alcohol. More consistent results have been obtainable through the inhibition of the wild yeast growth and a subsequent addition of selected pure cultures of yeasts to provide a reliably good wine. The inhibition is normally achieved by the addition of sulfur dioxide to the grape "must" consisting of the cloudy juice and grape meats received from the press. As stated in an article entitled "Wine," by Maynard A. Amerine in the August 1964 issue of Scientific American, "The main function of this chemical is to inhibit the growth of the wild yeasts on the grape skins. They are replaced by the addition of pure cultures of yeasts that will produce a better wine. Besides suppressing the deleterious yeasts, the sulfur dioxide reduces oxidation (which may have a baneful effect, particularly on the quality of white wines) and also helps to acidify and clarify the wine. Sulfur dioxide is a dangerous tool—an excess of it will ruin the wine—but all in all its use has been a major 20th-century benefit to wine making, contributing in various ways to better regulation of the fermentation, a higher yield of alcohol from the sugar and a more flavorful product."

As is noted in the quoted portion of the article, an excess of sulfur dioxide can be extremely harmful. Furthermore, many well-known industrial bacteriologists are in agreement that the sulfur dioxide has an unfavorable effect on the yeast-cell metabolism. Sulfur dioxide also has a disinfectant function in that it kills undesirable bacteria or micro-organisms. Such organisms most frequently exist in the insoluble solids existent in the grape must and it is accordingly present practice to extract the juice with a minimum amount of such solids so that the total amount of sulfur dioxide addition can be kept below a level which will deleteriously impede the required yeast activity in the process.

A compromise has thus been necessary, particularly in the production of fine wines, between the extraction of a juice with a minimum amount of solids and the requirement for an excessive use of sulfur dioxide. Since the latter is obviously intolerable, a relatively low percentage yield has been obtained from the grapes and, furthermore, since a considerable amount of the fruity flavors of the grape are contained in the solids, optimum aroma and bouquet of the wine are not achieved.

SUMMARY OF THE PRESENT INVENTION

In short, some of the advantages achieved by current wine production techniques are offset to a large degree by concomitant disadvantages and it is, accordingly, a general objective of the present invention to provide a winemaking process which is capable of providing a high yield from the grapes yet which will produce a very high quality wine of excellent aroma and bouquet and, moreover, is capable of achieving such excellence in an economical manner so as to lend itself to high capacity industrial production.

Generally, this objective is achieved by a process whose steps most effectively utilize the natural characteristics of the grapes. After initial crushing, destemming and pressing of the grapes, the resultant grape must including the cloudy juice and the grape meats is initially subjected to a particular form of depectinizing. Generally, depectinizing involves the treatment of the must and, more particularly, the pectin contained therein in the form of a colloid so that it is dissolved essentially into galacturonic acid. In accordance with general practice, 6 to 8 lbs. of a commercial pectic enzyme is added for each ton of grape must and because of the noted reaction, a higher yield of so-called "free run" is achieved. More particularly, an increase in the dry extract of the wine is achieved to release more of the fruity flavors of the wine so that its ultimate bouquet is enhanced. Typically, the depectinizing reaction is allowed to proceed for a period of approximately 8 hours.

Whereas the pectinizing step has been generally known for 25 years or more, and the advantages thereof are well established, it has not been employed frequently because it is normally accompanied by a brown coloration which is unacceptable, particularly in the production of white wines. However, in accordance with an additional aspect of the present invention, an inert gas, such as carbon dioxide, is added to the grape must during the depectinizing step to essentially purge the oxygen therefrom and consequently retard the brown coloration activity and at the same time inhibit yeast activity.

Subsequently, the free run liquid and the insoluble solids can be separated, for example, by a filtration process but preferably by a flotation step which is particularly effective since the previously described depectinization step facilitates the separation of the insoluble solids and the free run liquid which is to be subsequently subjected to fermentation. Preferably, the liquid and solid separation by flotation involves the initial division of the depectinized must into two separate quantities, one portion of which is subjected to a pressure of, for example, 40 p.s.i. through introduction of an inert gas, such as carbon dioxide, and is subsequently remixed in controlled amounts with the grape must which is not placed under pressure. When the juices are remixed at atmospheric pressure, a large number of microscopic bubbles of the gas are released from solution thus to transport a good proportion of the insoluble solids to the surface of the mixture in a flotation tank for subsequent scraping or other mechanical removal. The heavier solids, of course, drop to the bottom of the flotation tank and are, in turn, removed by a mechanical scraping mechanism, at this point leaving within the flotation tank only the clean juice to be drawn off for pumping to the fermentation chambers. Since the solids are fully separated from the juice by the described conjoint use of the depectinizing and flotation steps, substantially all bacteria are removed from the remaining clean juice. It is also to be expressly observed that the grape must is continuously exposed to carbon dioxide or other inert gas during both the depectinization and subsequent flotation steps so that development of the wild yeasts contained therein is greatly inhibited.

In the fermentation tanks or vats, a desired strain of yeast is added to instigate this step of the process and preferably such yeast takes the form of a disinfected yeast which is developed from appropriate treatment of the recovered wild yeast, as will be discussed hereinafter. As the formation of the alcohol in the fermentation step proceeds, tartrates will crystallize in a known fashion and will settle to the bottom together with the yeast. The young wine is removed from the fermentation tanks for appropriate bottling or other storage and the settled tartrates and yeast are preferably taken up in water to form a slurry which is then subjected to centrifugal separation in a specially designed but well-known centrifugal separator, such as the Dorrclone manufactured by Dorr-Oliver Inc. in which the heavier tartrate crystals will concentrate against the outer wall and the yeast will remain in the central portion.

The tartrates or cream of tartar, as it is commonly known, are drained off at the bottom of the centrifugal separator and, of course, can be used for the manufacture of tartaric acid or other byproducts.

The separated wild yeast, in turn, is disinfected preferably by the initial addition of phosphoric acid to establish a pH of approximately two and the subsequent addition of a small amount of ammonium persulfate in the amount of approximately 0.3 gram per each pound of the yeast. The mixture is stirred and held for a minimum of one hour and then may be spray dried to produce a dry disinfected yeast.

Such dry yeast can be mechanically "broken," for example, through use of a high speed colloid mill, for use in subsequent fermentation. Thus, the natural yeast, itself, after appropriate disinfection can be utilized in future wine processing.

It is to be additionally observed that during the fermentation process $CO_2$ is generated and this, in turn, can be delivered as required for use in the depectinizing and flotation steps of the method, thus to render the entire process economical as well as advantageous in the production of excellent quality wine.

BRIEF DESCRIPTION OF THE DRAWING

The stated objective of the invention and the previous summary thereof will be more readily understood by reference to the following detailed description of the single figure in the drawing diagrammatically illustrating apparatus for carrying out the steps of the improved wine-making process in its preferred form.

DESCRIPTION OF THE PREFERRED EMBODIMENT

The fresh grapes are dumped from trucks or bins into a screwconveyor 10 whose speed is controlled so that they are delivered at an appropriate rate to a combined crusher and destemmer 12 which may, for example, constitute a Garolla crusher or any other conventional type.

From the crusher 12, the broken and destemmed grapes are delivered to the input end of a continuous press 14 which functions in its conventional fashion to separate the grape must, constituting of the cloudy juice and grape meats, from the seeds and skins of the grapes. The grape must, itself, is pumped, preferably by use of a moyno pump 16 to a plurality of depectinizing tanks 18 to which the requisite quantity of pectic enzymes are added in the manner and quantity previously described.

Carbon dioxide is also delivered by a suitable compressor 20 from the fermentation tanks 22 to be described hereinafter into the bottom of the depectinizing tanks 18 so as to displace the oxygen or air in the grape must so as to inhibit wild yeast growth, as previously mentioned.

After approximately 8 hours of depectinizing, the depectinized must is delivered from a number of the tanks 18 to a main discharge conduit 26 but a portion is delivered through a second bypass conduit 28 to a sealed pressure tank 30 under control of a suitable valve 32 which is closed after the requisite amount of depectinized must is delivered thereto. A valve-controlled conduit 34 extends from the lower end of the pressure tank 30 to rejoin the previously described main conduit 26 so that a portion of the grape must which is pressurized in the tank 30 is remixed with the main body of grape must which has been maintained at atmospheric pressure. Preferably, pressure is obtained in the described pressure tank 30 through the introduction of carbon dioxide also delivered from the fermentation tanks 22 under relatively high pressure through use of the described compressor 20 so that ultimately a pressure within the presure tank 30 of approximately 40 p.s.i. is obtained and under this pressure a relatively large quantity of the carbon dioxide goes into solution with the grape must.

When the discharge conduit 34 is opened to deliver the pressurized grape must to the main line or conduit 26, all of the must is then delivered through a continuing conduit 36 into a flotation tank 38 which is maintained at atmospheric pressure. As a consequence, small microscopic bubbles of carbon dioxide are released from solution because of the reduction in pressure and pass upwardly through the grape must to carry therewith substantially all of the insoluble solids which then can be scraped from the uppermost level of the flotation tank by a suitable continuous conveyor 40. Another scraping mechanism 42 is mounted in the bottom of the tank to periodically remove heavier insoluble solids which accumulate in this position over a period of time.

Thus, all of the insoluble solids including the bacteria, which lodges primarily therein, are removed and substantially clean juice is left in the flotation tank 38 for subsequent discharge through a conduit 44 and under the force of a pump 46 into the fermentation tanks 22. In such fermentation tanks 22, a controlled quantity of yeast is supplied to instigate the fermentation action whereupon alcohol and carbon dioxide are generated, the carbon dioxide drawn off from the top of the tanks for delivery through the described compressor 20 and thence to the afore-mentioned pressure tank 30 and the depectinizing tanks 18.

During the fermentation process, as previously mentioned, the tartrates and yeast gradually settle to the bottom and are periodically removed through suitable openings while the young wine is withdrawn from the side of the tanks for subsequent storage or bottling.

The mixture of tartrates and yeast are delivered, in turn, to a centrifugal separator 48 in the form of a slurry, which is formed by the addition of water and this centrifugal separation enables the tartrates to be drawn off for any desired use while the yeast is subsequently withdrawn for treatment in a separate tank 50 with the appropriate addition of phosphoric acid and ammonium persulfate, as previously described. The disinfected yeast preferably dehydrated as through use of a spray drier 52 and is subsequently exposed to a mechanical breaking operation performed, for example, in a high speed colloid mill 54 of conventional design. The disinfected yeast product may then be kept for initiating subsequent fermentations.

It will be appreciated that many variations can be made in the process and apparatus described without departing from the spirit of the invention, and the foregoing description of one exemplary process and apparatus for carrying out such process is to be considered only for purposes of illustration and not in a limiting sense. The actual scope of the invention is to be indicated only by reference to the appended claims.

What is claimed is:
1. A winemaking process which comprises the steps of pressing the grapes to produce a grape must including juice and some insoluble solids,
depectinizing the grape must,
mixing at least a substantial portion of the depectinized must with a gas under pressure of approximately 40 pounds per square inch whereby a high proportion of the gas goes into solution,
remixing the pressurized must with any remaining unpressurized must,
then separating clear juice from the solids of the must by flotation at atmospheric pressure whereby the gas is released from solution in the form of small bubbles which pass upwardly through the grape must to carry therewith substantially all of the insoluble solids,
removing the separated solids from the juice, and
fermenting the clear juice to produce the wine.
2. A winemaking process according to claim 1 wherein, the gas is carbon dioxide.
3. The winemaking process of claim 1 which comprises withdrawal of yeast from the fermentation step upon its completion and disinfection of such yeast for further use in fermentation.

References Cited
UNITED STATES PATENTS

| 1,325,094 | 12/1919 | Hieber | 99—155 |
| 2,047,935 | 7/1936 | Beal et al. | 99—155 |
| 3,401,040 | 9/1968 | Mury | 99—35 X |
| 3,415,657 | 12/1968 | Akin | 99—96 |

OTHER REFERENCES

Amerine et al.: "The Technology of Winemaking," The Avi Publ. Co., Inc., Westport, Conn., 2nd ed. 1967 (pp. 490–499).

A. LOUIS MONACELL, Primary Examiner

D. M. NAFF, Assistant Examiner

U.S. Cl. X.R.
99—105, 106